US007970081B2

(12) United States Patent
Guey et al.

(10) Patent No.: US 7,970,081 B2
(45) Date of Patent: Jun. 28, 2011

(54) DELAY-DOPPLER CHANNEL RESPONSE DEMODULATION METHOD AND APPARATUS

(75) Inventors: Jiann-Ching Guey, Cary, NC (US); Abdulrauf Hafeez, Cary, NC (US); Dennis Hui, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1141 days.

(21) Appl. No.: 11/432,146

(22) Filed: May 11, 2006

(65) Prior Publication Data

US 2007/0263752 A1 Nov. 15, 2007

(51) Int. Cl.
*H04L 27/06* (2006.01)

(52) U.S. Cl. .......... 375/340; 375/150; 375/343; 342/99; 342/357.27; 342/357.38; 342/419; 708/813; 708/823; 708/824

(58) Field of Classification Search .................. 375/325, 375/340, 150, 142, 343, 347; 342/84, 99, 342/105, 25 E, 25 D, 25 F, 21, 194, 196, 342/357.04, 357.38, 357.27, 378, 405, 402, 342/411, 419–421, 427, 428, 418; 708/5, 708/404, 405, 422, 424, 446, 444, 510, 511, 708/605, 622, 813, 814, 823, 824; 367/150, 367/142, 343, 340, 347
See application file for complete search history.

(56) References Cited

U.S. PATENT DOCUMENTS

| | | | | |
|---|---|---|---|---|
| 4,684,950 | A | * | 8/1987 | Long .............................. 342/94 |
| 5,557,637 | A | * | 9/1996 | Glynn ........................... 375/271 |
| 6,445,342 | B1 | | 9/2002 | Thomas et al. |
| 6,470,699 | B1 | * | 10/2002 | Okuda et al. ................. 62/259.2 |
| 6,826,240 | B1 | * | 11/2004 | Thomas et al. ............... 375/340 |
| 2002/0034161 | A1 | | 3/2002 | Deneire et al. |
| 2002/0054621 | A1 | * | 5/2002 | Kyeong et al. ................ 375/147 |
| 2002/0176485 | A1 | * | 11/2002 | Hudson ........................ 375/144 |
| 2003/0086371 | A1 | * | 5/2003 | Walton et al. ................. 370/235 |
| 2004/0042531 | A1 | * | 3/2004 | Arikan et al. ................. 375/148 |
| 2004/0086055 | A1 | * | 5/2004 | Li ................................... 375/260 |
| 2006/0245347 | A1 | * | 11/2006 | Jayaraman et al. ........... 370/208 |

OTHER PUBLICATIONS

Speidel et al. "An adaptive two-dimensional channel estimator for wireless OFDM with application to mobile DVB-T", Jun. 2000, IEEE transaction on broadcasting, vol. 46,No. 2, pp. 128-133.*

(Continued)

*Primary Examiner* — David Payne
*Assistant Examiner* — Rahel Guarino
(74) *Attorney, Agent, or Firm* — Coats & Bennett, P.L.L.C.

(57) ABSTRACT

A wireless communication device uses a time-invariant delay-Doppler channel response estimate for received signal demodulation. The device provides coherent signal demodulation by accounting for frequency and time selectivity in a land-based mobile communication environment, which arise mainly because of delay and Doppler shifts, respectively. In one embodiment, the wireless communication device includes a channel estimator that estimates channel response in a wireless communication network by estimating a delay-Doppler response of a wireless communication channel to obtain a delay-Doppler channel response estimate and converting the delay-Doppler channel response estimate to a time-varying channel response estimate, e.g., a time-varying frequency or impulse response. The delay-Doppler response may be estimated in a continuous or discrete domain. In one embodiment, the channel estimator includes a delay-Doppler correlator that measures the delay-Doppler response by observing a response of a wireless communication channel to a pilot signal and converting the observed response to a delay-Doppler domain.

20 Claims, 4 Drawing Sheets

OTHER PUBLICATIONS

Sanzi, F et al., "An Adaptive Two-Dimensional Channel Estimator for Wireless OFDM with Application to Mobile DVB-T", Broadcasting, IEEE Transactions on, vol. 46, No. 2, pp. 128-133, Jun. 2000, p. 128, left column, line 1-line 46; p. 129, right column, line 12-p. 130, left column, line 36.

Guey, J-C, "Synchronization Signal Design for OFDM Based On Time-Frequency Hopping Patterns", Communications , 2007. ICC '07. IEEE International Conference on, pp. 4329-4334, Jun. 24-28, 2007, p. 4329, left column, line 45-p. 4330, right column, line 14; p. 4333, right column, line 16-line 36.

Fukuhara, T et al, "A Novel Channel Estimation Method for OFDM Transmission Technique under Fast Time-variant Fading Channel", Vehicular Technology Conference, 2003 VTC 2003-Spring, The 57th IEEE Semiannual, vol. 4, pp. 2343-2347 vol. 4, Apr. 22-25, 2003, p. 2343, left column, line 1-line 9; p. 2343, left column, line37-p. 2344, left column, line3; p. 2344, right column, line 1-line 9.

Bello, P: "Characterization of Randomly Time-Variant Linear Channels", Communications, IEEE Transactions on [Legacy, pre-1988] , vol. 11, No. 4, pp. 360-393, Dec. 1963, p. 363, left column, line 4-right column, line 25, figure 5.

Ricker et al., "A Model-Based Estimator-Correlator (EC) Structure," IEEE Transactions on Signal Processing, Oct. 2000, pp. 2733-2742, vol. 48, No. 10.

Blatt et al., "An Azimuth-Doppler-Delay Scattering Function: Definition and Estimation," IEEE 54th Vehicular Technology Conference, fall 2001, pp. 1789-1793, vol. 3.

Coleri, Sinem et. al. "Channel Estimation Techniques Based on Pilot Arrangement in OFDM Systems." IEEE Transactions On Broadcasting, Sep. 2002, pp. 223-229., vol. 48, No. 3.

Laurenti, Nichola and Toniolo, Paola. "Performance of the Multi-band OFDM UWB System with Time-varying Channels." 4 pages, 7th intl. symposium on wireless personal multimedia communications (WPMC), Italy, Sep. 2004.

Schur, Romed. "Impulse Compression for OFDM Transmission over Time-varying Multipath Channels." IEEE, 2002, 3 pages.

Shen, Yushi and Martinez, Ed. "Channel Estimation in OFDM Systems." Freescale Semiconductor Application Note, 2006, 16 pages, Rev. 0 Jan. 2006, Freescale Semiconductor, Inc.

* cited by examiner

DELAY-DOPPLER CHANNEL RESPONSE DEMODULATION METHOD AND APPARATUS

BACKGROUND

The present invention generally relates to wireless communication receivers, and particularly relates to signal demodulation in wireless communication receivers.

Communication over wireless networks occurs by modulating information-bearing waveforms onto carriers, e.g., sinusoid carriers. Modulated signals are transmitted through wireless communication channels to one or more receivers, subjecting the signals to noise and interference. Wireless communication channels may be modeled as linear time-varying systems. Using a time-varying linear model of the channel, the relationship between a transmitted signal x(t) and a received signal r(t) is given by:

$$r(t) = \int g(t,\tau) x(t-\tau) d\tau + z(t) \quad (1)$$

where z(t) is an Additive White Gaussian Noise (AWGN) function and g(t, τ) is the time-varying instantaneous channel impulse response, where time variations of the channel are represented by the variable t and time dispersiveness or spread of the channel is represented by the variable τ. An accurate model or estimate of the channel impulse response g(t, τ) is used to properly reconstruct transmitted signals, e.g., to properly restore amplitude and phase information of transmitted symbols, thus enabling coherent signal demodulation.

Some wireless communication systems employ time and frequency selective modulation techniques. In such systems, both the frequency and time selectivity of a wireless communication channel is estimated to ensure proper demodulation of signals transmitted over the channel, where frequency selectivity is a measure of channel response variation with respect to the frequency of a transmitted signal and time selectivity is a measure of channel response variation with respect to the movement of a transmitter and/or receiver. In single carrier transmission networks such as Code Division Multiple Access (CDMA) based networks, the frequency selectivity of the channel is conventionally estimated by correlating a received signal with a known pilot signal and time selectivity is conventionally measured by observing a multiplicity of the pilot signals periodically inserted over time.

In Orthogonal Frequency Division Multiplexing (OFDM) based networks, data symbols are modulated onto orthogonal time-frequency units defined by the frequency sub-carriers of an OFDM symbol. As such, a wireless communication channel in an OFDM network is conventionally described by a time-varying frequency response H(t,f) as given by:

$$H(t,f) = \int g(t,\tau) e^{-j2\pi f \tau} d\tau \quad (2)$$

Channel estimation in OFDM networks is conventionally accomplished by replacing data symbols with known pilot symbols across time, frequency, or both such that the time-varying impulse response of the channel may be interpolated using the known pilot symbols. One conventional approach, referred to as block-type pilot channel estimation, is based on a slow fading channel model and is performed by inserting known pilot symbols into all subcarriers of OFDM symbols within a specified symbol period, e.g., every N block of OFDM symbols. Some conventional block-type pilot channel estimators are Least-Square (LS) estimators, Minimum Mean-Square Error (MMSE) estimators, and modified MMSE estimators. Block-type pilot channel estimation models are not suitable for fast fading channels where channel response may vary between OFDM symbol blocks. Channel estimation in fast fading OFDM channels is conventionally done using a comb-type pilot estimation technique where known pilot symbols are inserted into a subset of the OFDM subcarriers of each OFDM symbol block. Some conventional comb-type pilot channel estimators are LS estimators, Maximum Likelihood (ML) estimators, and parametric channel modeling-based estimators.

Conventional channel estimators, such as those described above, model the instantaneous impulse response of a wireless communication channel to a pilot signal and use the modeled response to perform receive signal demodulation in accordance with equation (1). However, the time selectivity of a wireless communication channel in a land-based mobile communication environment originates mainly from the movement of transmit and receive terminals within the environment. As a result, channel time selectivity arises mainly from Doppler shift, i.e., the change in distance between a transmitter and receiver with time, which manifests itself as a change in transmission delay, phase and path loss with time.

SUMMARY

According to the methods and apparatus taught herein, a time-invariant channel response estimate based on delay-Doppler shift is used to demodulate received signals in a wireless communication receiver. A time-invariant delay-Doppler channel response estimate provides an accurate model of time and frequency selectivity in a land-based mobile communication environment, the time selectivity originating mainly from Doppler shift and the frequency selectivity originating from delay spread. The delay-Doppler channel response estimate may be converted to a time-varying channel response estimate for demodulating received signals modulated in accordance with a time and frequency selective modulation scheme such as Code Division Multiple Access (CDMA) and Orthogonal Frequency Division Multiplexing (OFDM).

One embodiment of a channel estimator and corresponding method estimates channel response in a wireless communication network by estimating a delay-Doppler response of a wireless communication channel to obtain a delay-Doppler channel response estimate. The delay-Doppler estimate is then converted to a time-varying channel response estimate, e.g., a time-varying frequency or impulse response. The channel estimator includes a delay-Doppler correlator that estimates the delay-Doppler channel response by computing a delay-Doppler image of the channel response. The delay-Doppler image is computed by observing a response of a wireless communication channel to a pilot signal and converting the observed response to a delay-Doppler domain.

The channel estimator may be included in a wireless communication device, e.g., a wireless receiver. In one embodiment, the wireless communication device comprises the channel estimator and a demodulator. The channel estimator is configured to convert a delay-Doppler channel response estimate to a time-varying channel response estimate. The demodulator is configured to demodulate received signals using the time-varying channel response estimate.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
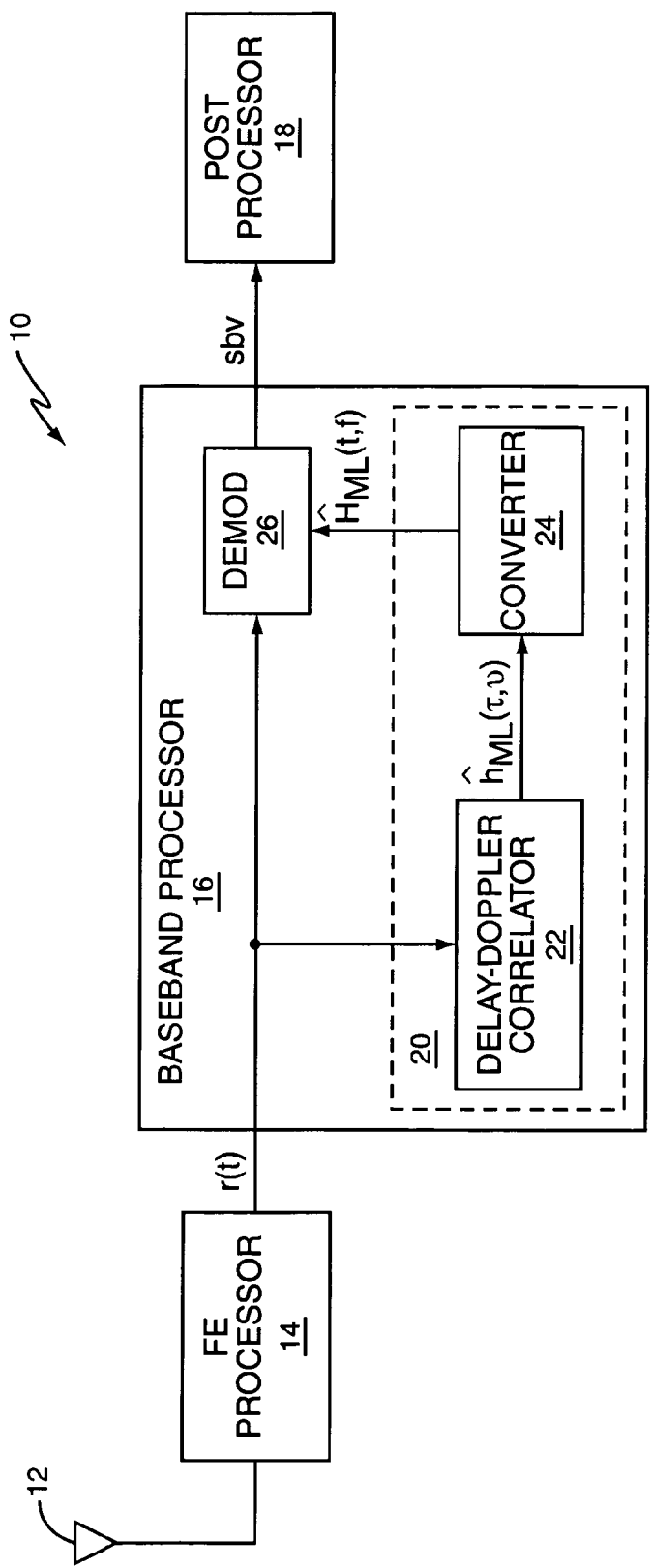
FIG. 1 is a block diagram of one embodiment of a wireless communication receiver having a delay-Doppler based channel estimator.

FIG. 1 illustrates a wireless communication receiver 10 that demodulates signals received from one or more wireless communication channels (not shown) using a time-invariant delay-Doppler channel response estimate that accounts for delay-Doppler shift of the channel(s). The receiver 10 uses a delay-Doppler model of the channel response to account for frequency and time selectivity in a land-based mobile communication environment, which originate mainly from delay and Doppler shifts, respectively. As such, a time-invariant delay-Doppler channel response estimate $\hat{h}(\tau, \nu)$ provides a more direct and accurate representation of a channel as compared to conventional time-varying channel response models. The receiver 10 uses the delay-Doppler channel response estimate to coherently demodulate signals modulated in accordance with a time and frequency selective modulation scheme such as Code Division Multiple Access (CDMA) or Orthogonal Frequency Division Multiplexing (OFDM).

Operation of the receiver 10 is next described with reference to OFDM access technology, and particularly, with reference to a time-varying frequency channel response estimate $\hat{H}(t,f)$ used for received signal demodulation in OFDM-compliant devices. However, those skilled in the art will readily recognize that the receiver 10 may demodulate signals modulated in accordance with other time and frequency selective modulation scheme such as CDMA, e.g., by converting the delay-Doppler channel response estimate to a time-varying channel impulse response estimate $\hat{g}(t, \tau)$.

With this in mind, the delay-Doppler response $h(\tau, \nu)$ of a wireless communication channel is a representation of the complex-value gain of various scatters or targets in the channel that incur a delay $\tau$ and a Doppler shift $\nu$. The time-frequency response of the OFDM channels is given by:

$$H(t,f) = \iint h(\tau,\nu) e^{-j2\pi f \tau} e^{j2\pi \nu t} d\tau d\nu \quad (3)$$

where equation (3) represents a two-dimensional Fourier-transform of the delay-Doppler response in the time and frequency domains. To derive a time-frequency domain representation of the delay-Doppler channel response, an estimate of the delay-Doppler channel response is first computed by the receiver 10. Because the delay-Doppler response is compact and does not require interpolation between samples, a Maximum Likelihood (ML) estimate of the delay-Doppler channel response $\hat{h}_{ML}(\tau, \nu)$ is given by:

$$\hat{h}_{ML}(\tau, \nu) = \underset{h(\tau,\nu)}{\operatorname{argmax}} - \int \left| r(t) - \iint h(\tau, \nu) s_p(t-\tau) e^{j2\pi \nu t} d\tau d\nu \right|^2 dt \quad (4)$$

where $s_p(t)$ is a known pilot signal used to induce a response from a wireless communication channel. Further, the ML delay-Doppler channel response estimate satisfies the following equation:

$$I(\tau, \nu) \triangleq \int r(t) s_p^*(t-\tau) e^{-j2\pi \nu t} dt \quad (5)$$

$$= \iint \hat{h}_{ML}(\tau', \nu') \left[ \int s_p(t-\tau') s_p^*(t-\tau) e^{j2\pi(\nu'-\nu)t} dt \right] d\tau' d\nu'$$

$$\approx \iint \hat{h}_{ML}(\tau', \nu') \chi_{sp}(\tau-\tau', \nu-\nu') d\tau' d\nu' = \hat{h}_{ML}(\tau, \nu) \otimes \chi_{sp}(\tau, \nu)$$

where $I(\tau, \nu)$ is an image of the delay-Doppler response of the channel as induced by the pilot signal and $\chi_{s_p}(\tau, \nu)$ is the main lobe of the ambiguity function of the pilot signal, where the ambiguity function $\chi_{s_p}(\tau, \nu) = \int s_p(t) s_p^*(t-\tau) e^{-j2\pi \nu t} dt$ represents the energy localization of the pilot signal across delay and Doppler shift. Note, the convolution function denoted by the ⊗ symbol in equation (5), represents a two-dimensional convolution.

The receiver 10 produces a ML estimate of the time-frequency response of a wireless communication channel from the delay-Doppler image $I(\tau, \nu)$, thus enabling demodulation of received signals modulated in accordance with a time and frequency selective modulation scheme. The ML time-frequency channel response estimate $\hat{H}(t,f)$ may be derived from equation (5) by taking a two-dimensional Fourier transform of the delay-Doppler image in the time and frequency domains as given by:

$$\hat{H}_{ML}(t, f) \approx \frac{F^2\{I(\tau, \nu)\}}{X_{sp}(t, f)} \quad (6)$$

where the two-dimensional Fourier transform is defined as $$F^2\{I(\tau,\nu)\} = \iint I(\tau,\nu) e^{-j2\pi f \tau + j2\pi \nu t} d\tau d\nu \quad (7)$$

and the normalization factor $X_{sp}(t, f)$ is the two-dimensional Fourier transform of the main lobe of the ambiguity function $\chi_{s_p}(\tau, \nu)$. The pilot signal may be designed such that the corresponding normalization factor $X_{sp}(t, f)$ remains constant over much of its support, and thus, a ML estimate of the delay-Doppler channel response $\hat{h}_{ML}(\tau, \nu)$ may be approximated from the delay-Doppler image $I(\tau, \nu)$ with a constant scaling factor and the two may be used interchangeably thereafter. As such, the receiver 10 ascertains a ML estimate of the time-frequency response of a wireless communication channel by transforming the delay-Doppler image from the delay-Doppler domain to the time-frequency domain. The receiver 10 then uses the ML time-frequency channel response estimate to perform receive signal demodulation.

Continuing with the details of the receiver 10, the receiver 10 includes an antenna 12 that receives a radio frequency signal transmitted over a wireless communication channel and a front end processor 14 that filters and down-converts the received radio frequency signal to produce a baseband signal r(t). The receiver 10 also includes a baseband processor 16 that produces soft bit values (sbv) or symbol estimates corresponding to the baseband signal and a post processor 18 that performs other signal processing operations on the soft bit values, such as error correction decoding.

Figure 2:
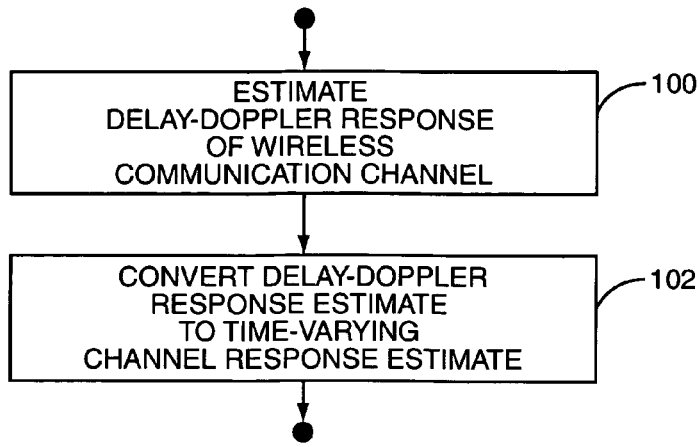
FIG. 2 is a logic flow diagram of one embodiment of processing logic for estimating a time-varying channel response estimate using a delay-Doppler channel response estimate.

A delay-Doppler based channel estimator 20 included in or associated with the baseband processor 16 generates a ML delay-Doppler response estimate $\hat{h}_{ML}(\tau, v)$ of a channel and uses the estimate to produce a ML time-frequency channel response estimate $\hat{H}(t,f)$. In more detail, the channel estimator 20 comprises a delay-Doppler correlator 22 and a converter 24. The delay-Doppler correlator 22 computes a ML delay-Doppler response estimate of a wireless communication channel, as illustrated by Step 100 of FIG. 2. The converter 24 then transforms the delay-Doppler channel response estimate to the time-frequency domain, as illustrated by Step 102 of FIG. 2. The conversion to the time-frequency domain may be followed by a normalization process to scale the time-frequency channel response estimate $\hat{H}(t,f)$ to an appropriate level for signal demodulation.

Figure 3:
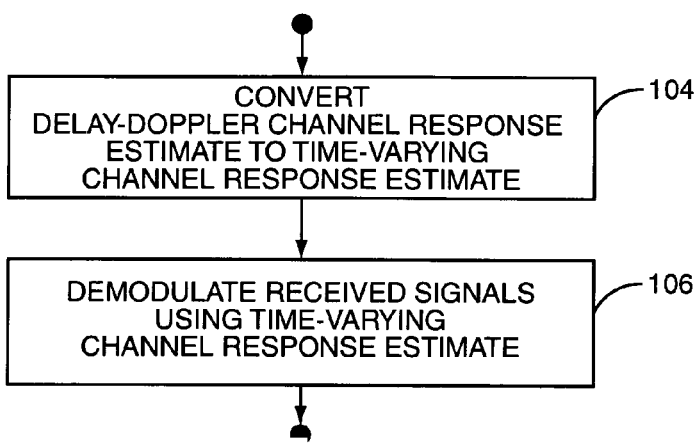
FIG. 3 is a logic flow diagram of one embodiment of processing logic for demodulating received signals using a delay-Doppler channel response estimate.

The channel estimator 20 provides the time-frequency channel response estimate $\hat{H}(t,f)$ to a demodulator 26 included in the baseband processor 16 for signal demodulation. The demodulator 26 demodulates baseband signals using the ML time-frequency channel response estimate provided by the channel estimator 20. As such, the baseband processor 16 demodulates received signals by transforming the delay-Doppler channel response estimate provided by the channel estimator 20 to a time-frequency domain, as illustrated by Step 104 of FIG. 3. The baseband processor 16 then uses the time-frequency channel response estimate to demodulate baseband signals, as illustrated by Step 106 of FIG. 3.

Figure 4:
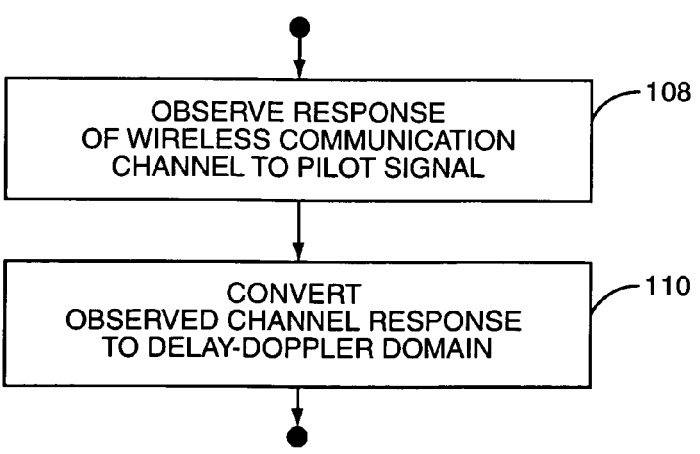
FIG. 4 is a logic flow diagram of one embodiment of processing logic for estimating the delay-Doppler response of a wireless communication channel.

Turning now to a more detailed discussion of the channel estimator 20, the delay-Doppler correlator 22 computes the delay-Doppler image by observing a response of a wireless communication channel to a pilot signal, as illustrated by Step 108 of FIG. 4. In some embodiments, the pilot signal induced channel response is observed in a continuous domain while in other embodiments it is measured in a discrete domain. Regardless, the delay-Doppler correlator 22 then completes the computation of the delay-Doppler image by converting the observed channel response to the delay-Doppler domain, as illustrated by Step 110 of FIG. 4. In some embodiments, the observed channel response is transformed to a continuous delay-Doppler domain while in other embodiments, it is transformed to a discrete delay-Doppler domain.

Figure 5:
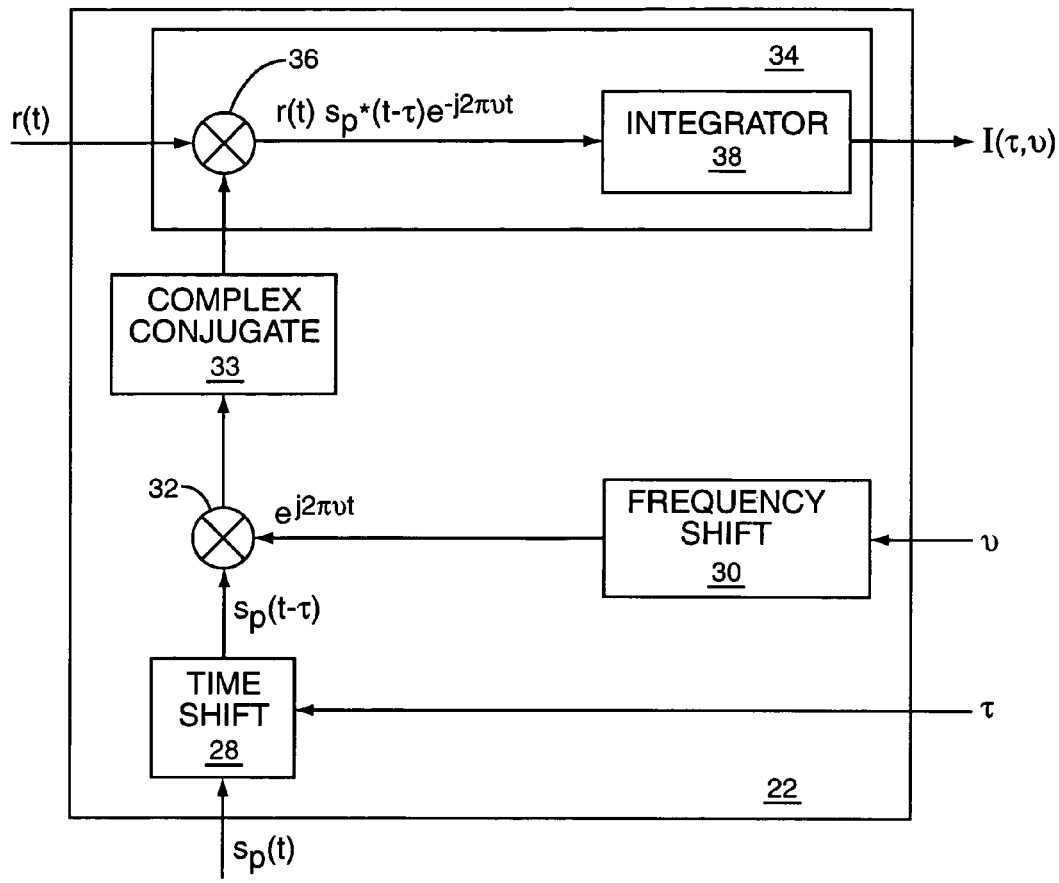
FIG. 5 is a block diagram of one embodiment of a continuous delay-Doppler correlator.

FIG. 5 illustrates a continuous domain embodiment of the delay-Doppler correlator 22. A continuous evaluation of the delay-Doppler image $I(\tau, v)$ is generated by convolving the complex conjugate of a time and frequency shifted pilot signal with the received signal $r(t)$ in accordance with equation (5). Particularly, a time shift element 28 varies the time delay of the pilot signal $s_p(t-\tau)$ in accordance with a delay variable $\tau$ while a frequency shift element 30 varies the frequency offset of the signal $e^{j2\pi vt}$ using a Doppler shift variable $v$. Various delay and Doppler shift values may be provided to the time and frequency shift elements 28, 30 from a set of data containing a range of delay and Doppler shift data. The range of delay and Doppler shift data may be limited by maximum or worst case values, e.g., $|\tau| < \tau_{MAX}$ and $|v| < v_{MAX}$.

Regardless, a combiner circuit 32 then combines the outputs of the time and frequency shift elements 28, 30 to form the pilot signal shifted in time and frequency, the time and frequency shift corresponding to the range of delay and Doppler shift data provided to the shift elements 28, 30, respectively. A conjugate element 33 then performs a complex conjugate operation on the output of the combiner 32. A convolution circuit 34 formed by a multiplier 36 and an integrator 38 produces the delay-Doppler image $I(\tau, v)$ by convolving the received signal with the complex conjugate of the time and frequency shifted pilot signal. That is, the multiplier 36 combines the received signal and the complex conjugate of the shifted pilot signal and the resulting product, $r(t)s_p^*(t-\tau)e^{-j2\pi vt}dt$, is then integrated by the integrator 38 to produce a delay-Doppler image of the channel response as induced by the pilot signal.

Figure 6:
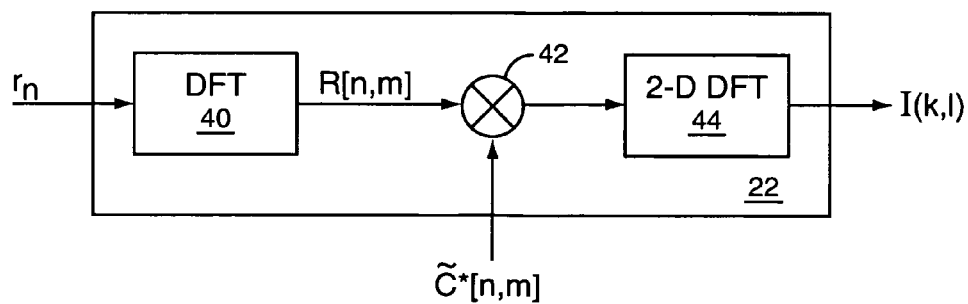
FIG. 6 is a block diagram of one embodiment of a discrete delay-Doppler correlator.

FIG. 6 illustrates a discrete domain embodiment of the delay-Doppler correlator 22. For ease of explanation, the discrete domain embodiment will next be described with reference to OFDM-based signals. However, those skilled in the art will readily recognize that the discrete domain embodiment of the delay-Doppler correlator 22 can process baseband signals modulated according to other time and frequency selective modulation schemes, e.g., CDMA. With this in mind, a discrete estimation of the delay-Doppler image $I[k,l]$ is generated by combining a discrete time-frequency domain representation of a complex conjugate pilot signal ($\tilde{C}^*[n,m]$) with a discrete time-frequency domain representation of a received OFDM signal ($R[n,m]$) where n represents the $n^{th}$ OFDM symbol and m represents the $m^{th}$ OFDM sub-carrier. In this particular embodiment, the delay-Doppler image is calculated discretely, e.g., by sampling the continuous delay-Doppler image function given by equation (5). Sampling of the continuous delay-Doppler image function may be approximated by a series of Discrete Fourier Transform (DFT) operations.

Specifically, by expressing a time domain pilot signal over a number of pilot periods as a sequence of OFDM symbols starting from an arbitrarily chosen instant t=0 as given by:

$$s_p(t) = \sum_{n=0}^{QN-1} c_n(t - nT_s) \tag{8}$$

where $T_s$ is the OFDM symbol duration. The output of the discrete delay-Doppler correlator 22 can be expressed as:

$$\begin{aligned} I(\tau, v) &= \int r(t) \sum_{n=0}^{QN-1} c_n^*(t - nT_s - \tau) e^{-j2\pi vt} dt \\ &= \sum_{n=0}^{QN-1} e^{-j2\pi vnT_s} \int r(t + nT_s) c_n^*(t - \tau) e^{-j2\pi vt} dt \\ &\approx \sum_{n=0}^{QN-1} e^{-j2\pi vnT_s} \int r(t + nT_s) c_n^*(t - \tau) dt \end{aligned} \tag{9}$$

where, in the last part of equation (9), the second exponent term is dropped because $vt$ is approximately zero over the range of interest. In other words, when $vt$ is approximately zero, the channel may be considered to be time-invariant over a particular OFDM symbol. The discrete delay-Doppler image is then given by:

$$I[k, l] \triangleq I(k\delta_\tau, l\delta_v) = \sum_{n=0}^{QN-1} e^{-j2\pi l\delta_v nT_s} \int r(t + nT_s) c_n^*(t - k\delta_\tau) dt \tag{10}$$

where $\delta_\tau$ and $\delta_v$ denote the sampling interval in the delay and Doppler domains, respectively.

In theory, the delay-Doppler image need only be sampled at its Nyquist rate, i.e., $\gamma_d = \gamma_D = 1$ where $\gamma_d$ is the sampling factor in the delay domain and $\gamma_D$ is the sampling factor in the Doppler domain. However, the observation window of the delay-Doppler image is limited by the sidelobe image. Thus, over-sampling may be needed to avoid aliasing when the delay-Doppler image is converted to the time-frequency domain. As such, the over-sampling factor for the delay domain is the integer $\gamma_d = T_c/\delta_\tau$. For an observation interval of $QT_p$, the Doppler resolution is $1/(QT_p)$. Thus, the over-sampling factor in the Doppler domain is given by the integer $\gamma_D = 1/(QT_p\delta_v)$. If the time domain pilot signal is expressed as a sequence of transmit filter pulses by:

$$c_n(t) = \sum_i c_n[i]u(t - iT_c) \quad (11)$$

then the integral in equation (10) becomes:

$$r(t+nT_s)c_n^*(t - k\delta_\tau)dt = \sum_i c_n^*[i]\int r(t+iT_c + k\delta_\tau + nT_s)u^*(t)dt \quad (12)$$
$$= \sum_i r_n[i\gamma_d + k]c_n^*[i]$$

Further, the output of the front-end processor 14 is a sampled version of the received continuous-time signal $r(t)$ at a sampling interval $\delta_\tau$, where the sampled version of the received signal may be expressed by:

$$r_n[i] = \int r(t+nT_s)u^*(t-i\delta_v)dt \quad (13)$$

Continuing with the discrete delay-Doppler image embodiment, the convolution in equation (12) becomes circular when positioned properly within the OFDM cyclic prefix window, and thus can be evaluated in the frequency domain using DFT by:

$$I[k,l] \approx \frac{1}{N_{fft}\gamma_d} \sum_{n=0}^{Q_N-1} \sum_{m=0}^{N_{fft}\gamma_d-1} e^{-j2\pi ln\delta_v T_s} e^{j2\pi km\delta_\tau f_s} R[n,m]\tilde{C}^*[n,m] \quad (14)$$
$$= \frac{1}{N_{fft}\gamma_d} \sum_{n=0}^{Q_N-1} \sum_{m=0}^{N_{fft}\gamma_d-1} R[n,m]\tilde{C}^*[n,m]e^{-\frac{j2\pi ln}{QN\gamma_D} + \frac{j2\pi km}{N_{fft}\gamma_d}}$$

where $N_{fft}$ is the number of sub-carriers in the OFDM system and $$R[n,m] = \sum_{i=0}^{N_{fft}\gamma_d-1} r_n[i]e^{\frac{j2\pi mi}{N_{fft}\gamma_d}} \quad (15)$$

is the length-$N_{fft\gamma_d}$ DFT of the over-sampled received signal corresponding to the $n^{th}$ OFDM symbol and $$\tilde{C}^*[n,m] = \sum_{i=0}^{N_{fft}-1} c_n[i]e^{-\frac{j2\pi mi}{N_{fft}}}, \quad m = 0, 1, \ldots, N_{fft}\gamma_d - 1 \quad (16)$$

is the discrete frequency domain representation of the pilot signal corresponding to the $n^{th}$ OFDM symbol repeated $\gamma_d$ times. Note that discrete representation of the pilot signal is non-zero only when a pilot symbol is transmitted on the $m^{th}$ sub-carrier in the $n^{th}$ OFDM symbol.

Returning to FIG. 6, a first transformation element 40 converts the received baseband signal ($r_n$) to a discrete time-frequency domain representation ($R[n,m]$), e.g., by performing a discrete Fourier transform on an over-sampled received continuous time signal. A combiner circuit 42 then combines the discrete time-frequency domain representations of the received baseband signal ($R[n,m]$) and the complex conjugate pilot signal ($\tilde{C}^*[n,m]$). A second transformation element 44 converts the combined discrete signal to the delay-Doppler domain, e.g., by performing a two-dimensional discrete Fourier transform on the combined signal in accordance with equation (14). As such, the discrete domain embodiment of the delay-Doppler correlator 22 yields a discrete delay-Doppler image $I[k,l]$ of the channel response as induced by a pilot signal.

Figure 7:
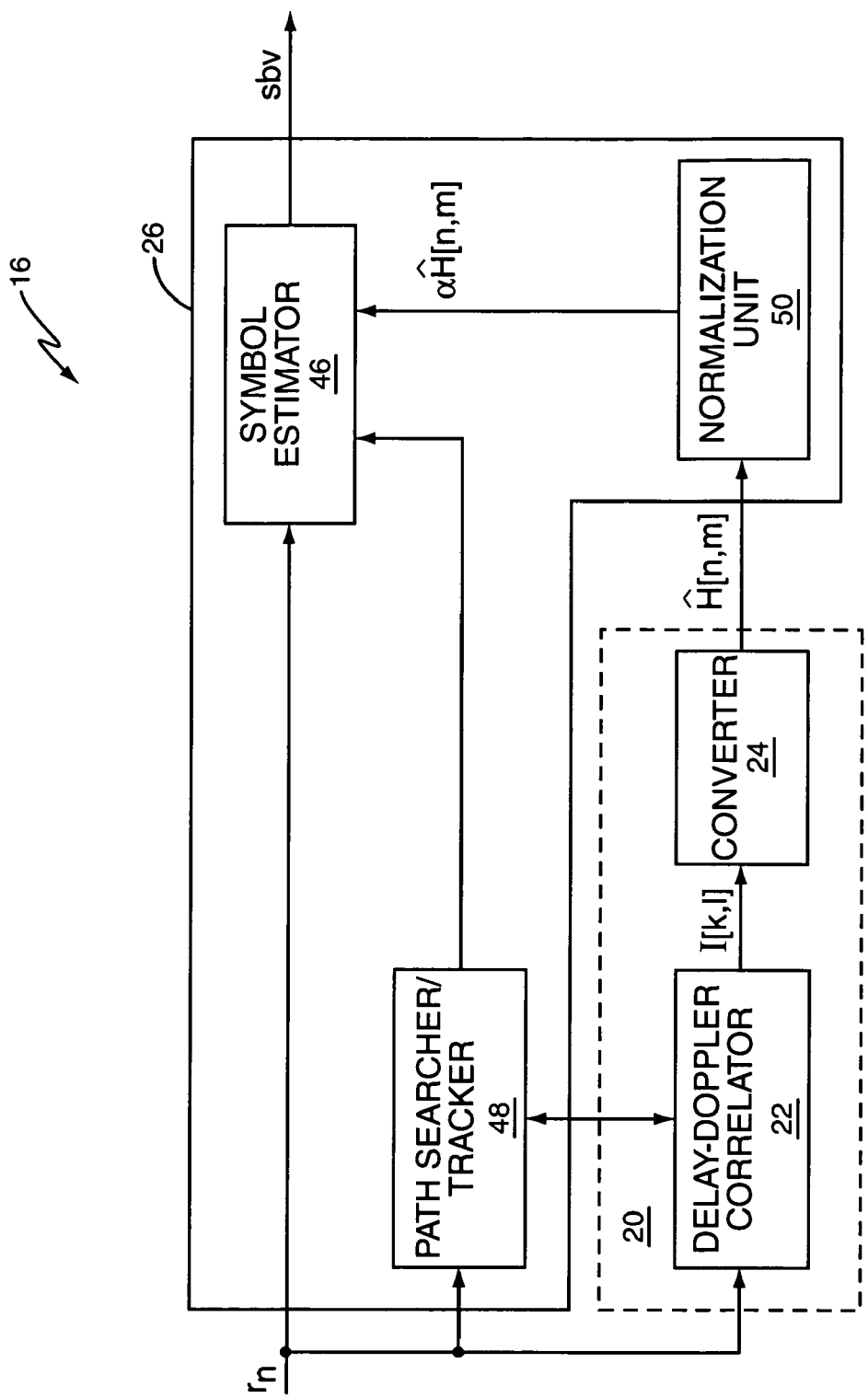
FIG. 7 is a block diagram of one embodiment of a broadband processor having a delay-Doppler based channel estimator and a signal demodulator.

The discrete delay-Doppler image, or alternatively the continuous delay-Doppler image, is converted by the channel estimator 20 to the time-frequency domain so that the demodulator 26 may use the resulting time-frequency channel response estimate to demodulate received signals. The following discussion concerning delay-Doppler image conversion to the time-frequency domain pertains to a discrete representation of the delay-Doppler image. However, those skilled in the art will readily recognize that a continuous representation of the delay-Doppler image may be converted to the time-frequency domain using equivalent continuous functions. With this in mind, FIG. 7 illustrates an embodiment of the baseband processor 16 included in the receiver 10.

The baseband processor 16, e.g., a Digital Signal Processor (DSP), includes the delay-Doppler based channel estimator 20 and the demodulator 26. The delay-Doppler correlator 22 produces a delay-poppler image $I[k,l]$ and the converter 24 transforms the delay-Doppler image to a time-frequency domain. In one embodiment, the converter 24 transforms the discrete delay-Doppler image to the time-frequency domain by performing a two-dimensional Fourier transform of the sampled delay-Doppler image as given by:

$$F^2\{I(\tau,v)\}\bigg|_{t=nT_s, f=mf_s} \propto \sum_{k,l} I[k,l]e^{-j2\pi mf_s k\delta_\tau + j2\pi nT_s l\delta_v} \quad (17)$$
$$= \sum_{k,l} I[k,l]e^{-\frac{j2\pi km}{N_{fft}\gamma_d} + \frac{j2\pi ln}{QN\gamma_d}} \triangleq \hat{H}[n,m]$$

Note that the discrete delay-Doppler image as given by equation (14) is evaluated only within the range of the maximum delay-Doppler shift. In general, the indices k and l are much smaller than their respective DFT sizes. As a result, the two-dimensional DFT of the discrete delay-Doppler image may be approximated as a low-pass filter that interpolates the channel response measured at the pilot locations to any given time-frequency locations.

The demodulator 26 uses the discrete time-frequency channel response estimate to enable coherent signal demodulation. A signal received from a wireless communication channel by the receiver 10 can be transformed to a two-dimensional discrete time-frequency representation in accordance with equations (13) and (15) as follows:

$$r[n,m] = H[n,m]x[n,m] + z[n,m] \quad (18)$$

where $r[n,m]$ is the received signal, $x[n,m]$ is the transmitted signal modulated in accordance with a time and frequency selective modulation scheme, H[n,m] is the time-frequency response of the channel and z[n,m] is an Additive White Gaussian Noise (AWGN) function. Given sufficient noise filtering, the transmitted signal may be recovered from the received signal by undoing or negating the effect the channel had on the transmitted signal, e.g., by multiplying the received signal with the complex conjugate of the time-frequency response of the channel. Leveraging the relationship given in equation (18), the demodulator 26 uses the time-frequency channel response estimate $\hat{H}(t,f)$ produced by the channel estimator 20 to recover the transmitted signal from the received signal. Particularly, the demodulator 26 includes a symbol estimator 46 that uses the discrete time-frequency channel response estimate to obtain soft bit values (sbv) or symbol estimates from the baseband signal ($r_n$).

In addition, the demodulator 26 may further include a path searcher/tracker 48 and/or a normalization unit 50. The path searcher/tracker 48 removes or suppresses clutter or false targets that cause performance degradation at the receiver. In one embodiment, the path searcher/tracker 48 removes those components of the delay-Doppler image that fall below a threshold, e.g., the components that fall outside a maximum range of the delay and Doppler shift variables ($|\tau|<\tau_{MAX}$ and $|\nu|<\nu_{MAX}$). In one embodiment, a conventional CDMA path searcher/tracker is modified to track the channel response resulting from terminal acceleration, $h(\tau,\nu,t)$, instead of tracking the channel's instantaneous impulse response, $g(t,\tau)$.

The normalization unit 50 scales the time-frequency channel response estimate to account for transmit and receive filter responses and/or the energy associated with the pilot signal. That is, the time-frequency channel response estimate as produced by the channel estimator 20 provides a mechanism for quantifying the effects a wireless communication channel has on transmitted signals. As such, the normalization unit 50 scales the time-frequency channel response estimate by a factor $\alpha$ to account for the response associated with transmit and receive filters and/or pilot signal energy. In one embodiment, the normalization unit 50 uses transmit/receive filter response data to weight the time-frequency channel response estimate, thus enabling coherent signal demodulation.

Recall that the delay-Doppler image $I(\tau, \nu)$ approximates a scaled Maximum Likelihood (ML) estimation of the delay-Doppler channel response $\hat{h}_{mL}(\tau, \nu)$ when the normalization factor $X_{sp}(t, f)$ associated with the corresponding pilot signal $s_p(t)$ is constant over much of its support, as given by equation (5). With this in mind, proper selection of the pilot signal eases the computation associated with calculating the delay-Doppler image. In an OFDM embodiment, properly spaced pilot symbols yield an ambiguity function having an extractable main lobe for use in calculating the delay-Doppler image. That is, by inserting pilot symbols every M sub-carriers and every N symbols in an OFDM network, a relatively constant normalization factor results over much of the support of the ambiguity function's two-dimensional Fourier transform.

An OFDM symbol, including cyclic prefix, has an interval of $T_s$ seconds and a sub-carrier frequency spacing $f_s=1/(T_s-T_{cp})$ where $T_{cp}$ is the cyclic prefix length. Assuming no cyclic prefix is used and all pilot symbols are un-modulated, the time domain signal of the pilot signal over Q pilot insertion periods can be expressed as:

$$s_p(t) = \sum_{n=0}^{Q-1}\sum_{m=0}^{M-1} u(t - mT_s/M - nT_p) \quad (19)$$

where u(t) is a wideband pulse shaping filter that the discrete samples from an OFDM modulator (not shown) are passed through. The ambiguity function $\chi_{s_p}(\tau, \nu)$ of a regularly spaced pilot signal is given by:

$$\chi_{Sp}(\tau, \nu) = \int \sum_{n=0}^{Q-1}\sum_{m=0}^{M-1} u\left(t - \frac{mT_s}{M} - nT_p\right) \quad (20)$$

$$\sum_{l=0}^{Q-1}\sum_{k=0}^{M-1} u^*\left(t - \frac{kT_s}{M} - lT_p - \tau\right)e^{-j2\pi\nu t}dt$$

$$= \sum_{n=0}^{Q-1}\sum_{m=0}^{M-1}\sum_{l=0,l\neq n}^{Q-1}\sum_{k=0,k\neq m}^{M-1} \int u\left(t - \frac{mT_s}{M} - nT_p\right)$$

$$u^*\left(t - \frac{kT_s}{M} - lT_p - \tau\right)dt + \Psi_{Sp}(\tau, \nu)$$

where the sum of cross correlations among pulses has been separated from the sum of the auto correlations given by:

$$\Psi_{Sp}(\tau, \nu) = \sum_{n=0}^{Q-1}\sum_{m=0}^{M-1} \int u\left(t - \frac{mT_s}{M} - nT_p\right) \quad (21)$$

$$u^*\left(t - \frac{mT_s}{M} - nT_p - \tau\right)e^{-j2\pi\nu t}dt$$

$$= \chi_u(\tau, \nu)\sum_{m=0}^{M-1} e^{-j2\pi\nu mT_s/M} \sum_{n=0}^{N-1} e^{-j2\pi\nu nT_p}$$

which is approximately the swath of area that is $1/f_p$ seconds wide along the Doppler axis, centered at zero delay.

Note, although not included in equation (21), an ambiguity sidelobe exists every $1/f_p$ seconds in the Doppler delay dimension. Also, the first summation term in equation (21) has a minimum impact on the ambiguity main lobe since $\nu T_s$ is close to zero around the main lobe. As such, the desired image is the one formed by the main lobe of the ambiguity function. Because the main lobe is relatively free from sidelobe image interference, it can be extracted via a two-dimensional low-pass filter having an appropriate bandwidth.

In summary, the wireless communication receiver 10 presented herein demodulates a signal received from a wireless communication channel using an estimate of the delay-Doppler response of the channel. The delay-Doppler channel response estimate, which may be derived in a continuous or discrete domain as disclosed herein, accounts for time and frequency selectivity in a land mobile communication environment, thus providing a more direct and accurate representation of a wireless communication channel as compared to conventional time-varying channel impulse models. The receiver 10 converts the delay-Doppler channel response estimate to a time-frequency domain to enable coherent demodulation of received signals modulated in accordance with a time and frequency selective modulation technique.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of estimating channel response in a wireless communication network, comprising:
   processing a pilot signal in the delay-Doppler domain using a set of linear equations to obtain an approximate image of a delay-Doppler response of a wireless communication channel over which the pilot signal is received by generating a complex conjugate of a time and frequency shifted version of the pilot signal, multiplying the complex conjugate of the time and frequency shifted version of the pilot signal with a signal received from the wireless communication channel to generate an observed response of the wireless communication channel to the pilot signal and converting the observed response to the delay-Doppler domain;
   estimating the delay-Doppler response of the wireless communication channel from the approximate delay-Doppler image; and
   converting the delay-Doppler response estimate to a time-varying channel response estimate.

2. The method of claim 1, wherein converting the delay-Doppler channel response estimate to a time-varying channel response estimate comprises transforming the approximate delay-Doppler image to a time-frequency domain.

3. The method of claim 1, wherein converting the observed response to a delay-Doppler domain comprises integrating a result of multiplying the complex conjugate of the time and frequency shifted version of the pilot signal with the received signal.

4. The method of claim 1, further comprising suppressing one or more components of the approximate delay-Doppler image.

5. The method of claim 4, wherein suppressing one or more components of the approximate delay-Doppler image comprises suppressing each component having a value outside a predetermined range of at least one of delay and Doppler shift variables.

6. The method of claim 1, wherein converting the delay-Doppler channel response estimate to a time-varying channel response estimate comprises transforming the delay-Doppler channel response estimate to a time-varying channel impulse response estimate.

7. The method of claim 1, further comprising normalizing the time-varying channel response estimate based on an ambiguity function of the pilot signal to account for at least one of a transmit filter response, a receive filter response, and received pilot signal energy.

8. The method of claim 7, comprising:
   extracting a mainlobe of the ambiguity function; and
   normalizing the time-varying channel response estimate based on the mainlobe of the ambiguity function.

9. A channel estimator for use in a wireless communication device, comprising:
   a delay-Doppler correlator configured to process a pilot signal in the delay-Doppler domain using a set of linear equations to obtain an approximate image of a delay-Doppler response of a wireless communication channel over which the pilot signal is received by generating a complex conjugate of a time and frequency shifted version of the pilot signal, multiplying the complex conjugate of the time and frequency shifted version of the pilot signal with a signal received from the wireless communication channel to generate an observed response of the wireless communication channel to the pilot signal and converting the observed response to the delay-Doppler domain; and
   a converter configured to convert the delay-Doppler channel response estimate to a time-varying channel response estimate.

10. The channel estimator of claim 9, wherein the converter is configured to transform the approximate delay-Doppler image to a time-frequency domain.

11. The channel estimator of claim 9, wherein the delay-Doppler correlator is configured to integrate a result of multiplying the complex conjugate of the time and frequency shifted version of the pilot signal with the received signal.

12. The channel estimator of claim 9, wherein the delay-Doppler correlator is further configured to suppress one or more components of the approximate delay-Doppler image.

13. The channel estimator of claim 12, wherein the delay-Doppler correlator is configured to suppress each component having a value outside a predetermined range of at least one of delay and Doppler shift variables.

14. The channel estimator of claim 9, wherein the converter is configured to transform the delay-Doppler channel response estimate to a time-varying channel impulse response estimate.

15. The channel estimator of claim 9, further comprising a normalization unit configured to normalize the time-varying channel response estimate based on an ambiguity function of the pilot signal to account for at least one of a transmit filter response, a receive filter response, and received pilot signal energy.

16. The channel estimator of claim 15, wherein the normalization unit is configured to extract a mainlobe of the ambiguity function and normalize the time-varying channel response estimate based on the mainlobe of the ambiguity function.

17. A method of computing an approximate delay-Doppler image of a channel response in a wireless communication device, comprising:
   observing a response of a wireless communication channel to a pilot signal at a wireless receiver by generating a complex conjugate of a time and frequency shifted version of the pilot signal and multiplying the complex conjugate of the time and frequency shifted version of the pilot signal with a signal received from the wireless communication channel; and
   converting the observed response at the wireless receiver to a delay-Doppler domain using a set of linear equations.

18. The method of claim 17, wherein converting the observed response to a delay-Doppler domain comprises integrating a result of multiplying the complex conjugate of the time and frequency shifted version of the pilot signal with the received signal.

19. A channel estimator for use in a wireless communication device, comprising a delay-Doppler correlator configured to observe a response of a wireless communication channel to a pilot signal by generating a complex conjugate of a time and frequency shifted version of the pilot signal and multiplying the complex conjugate of the time and frequency shifted version of the pilot signal with a signal received from the wireless communication channel and to convert the observed response to a delay-Doppler domain using a set of linear equations.

20. The channel estimator of claim 19, wherein the delay-Doppler correlator is configured to convert the observed response to a delay-Doppler domain by integrating a result of multiplying the complex conjugate of the time and frequency shifted version of the pilot signal with the received signal.

* * * * *

UNITED STATES PATENT AND TRADEMARK OFFICE
CERTIFICATE OF CORRECTION

| | |
|---|---|
| PATENT NO. | : 7,970,081 B2 |
| APPLICATION NO. | : 11/432146 |
| DATED | : June 28, 2011 |
| INVENTOR(S) | : Jiann-Ching Guey et al. |

It is certified that error appears in the above-identified patent and that said Letters Patent is hereby corrected as shown below:

On the Face Page, in Field (75) "Inventors", in Column 1, Line 3, inventor "Dennis Hul" should read --Dennis Hui--.

Signed and Sealed this
Fourth Day of October, 2011

David J. Kappos
*Director of the United States Patent and Trademark Office*

UNITED STATES PATENT AND TRADEMARK OFFICE
CERTIFICATE OF CORRECTION

PATENT NO. : 7,970,081 B2  
APPLICATION NO. : 11/432146  
DATED : June 28, 2011  
INVENTOR(S) : Guey et al.

Page 1 of 1

It is certified that error appears in the above-identified patent and that said Letters Patent is hereby corrected as shown below:

In Column 3, Line 54, delete "a delay sand" and insert -- a delay τ and --, therefor.

In Column 4, Lines 17-18, in equation (5), delete " $\approx \int\int \hat{h}_{ML}(\tau', v') \chi_{S_p}(\tau - \tau', v - v') d\tau' dv' = \hat{h}_{ML}(\tau, v) \otimes \chi_{S_p}(\tau, v)$ " and insert -- $\approx \int\int \hat{h}_{ML}(\tau', v') \chi_{S_p}(\tau - \tau', v - v') d\tau' dv' = \hat{h}_{ML}(\tau, v) \otimes \chi_{S_p}(\tau, v)$ --, therefor.

In Column 8, Line 35, delete "delay-poppler" and insert -- delay-Doppler --, therefor.

Signed and Sealed this  
Twenty-seventh Day of March, 2012

David J. Kappos  
*Director of the United States Patent and Trademark Office*